US009035624B1

(12) United States Patent
Rahimi et al.

(10) Patent No.: US 9,035,624 B1
(45) Date of Patent: May 19, 2015

(54) POWER SUPPLY CIRCUITRY AND CURRENT MEASUREMENT

(75) Inventors: Amir M. Rahimi, Irvine, CA (US); Parviz Parto, Laguna Niguel, CA (US)

(73) Assignee: International Rectifier Corporation, El Segundo, CA (US)

( * ) Notice: Subject to any disclaimer, the term of this patent is extended or adjusted under 35 U.S.C. 154(b) by 612 days.

(21) Appl. No.: 13/338,013

(22) Filed: Dec. 27, 2011

(51) Int. Cl.
*H02M 3/157* (2006.01)
*H02M 3/156* (2006.01)
*H02M 3/158* (2006.01)
*H02M 1/00* (2006.01)

(52) U.S. Cl.
CPC ............ *H02M 3/156* (2013.01); *H02M 3/1588* (2013.01); *H02M 2001/0009* (2013.01)

(58) Field of Classification Search
USPC .................................. 323/282, 283, 285–287
See application file for complete search history.

(56) References Cited

U.S. PATENT DOCUMENTS 6,381,159 B2 * 4/2002 Oknaian et al. ................. 363/98
RE38,940 E * 1/2006 Isham et al. .................. 323/224
7,710,084 B1 * 5/2010 Guo ............................. 323/224
7,919,952 B1 * 4/2011 Fahrenbruch ................ 323/222
2005/0162142 A1 * 7/2005 Kernahan et al. ............. 323/283
2005/0280404 A1 * 12/2005 LeFevre ........................ 323/282
2006/0017424 A1 * 1/2006 Wood et al. ................... 323/274
2011/0109291 A1 * 5/2011 Tang et al. .................... 323/282
2012/0019226 A1 * 1/2012 Wiktor .......................... 323/285
2012/0078556 A1 * 3/2012 Holmberg et al. .............. 702/64
2012/0235649 A1 * 9/2012 Uno ............................. 323/210

FOREIGN PATENT DOCUMENTS

WO WO 2010139358 A1 * 12/2010 ............ H02M 3/156

* cited by examiner

*Primary Examiner* — Fred E Finch, III
(74) *Attorney, Agent, or Firm* — Chapin IP Law, LLC

(57) ABSTRACT

According to one configuration, a power supply circuit includes an inductor, a monitor circuit, a storage resource, and a processor circuit. The inductor resides in a phase of the power supply and conveys current to a load. The monitor circuit monitors and samples the voltage of a node in the power supply. The voltage of the node may be a sawtooth or ramp waveform sampled by the monitor circuit. A magnitude of the voltage at the node varies depending on an amount of current passing through the inductor to the load. The monitor circuit initiates storage of at least one sample in a storage resource. A processor circuit utilizes the multiple sample voltages stored in the storage resource to produce a value indicative of the amount of average current conveyed through the inductor to the load.

24 Claims, 7 Drawing Sheets

LOAD
118
+V_OUT
Co
OUTPUT
VOLTAGE
190
125
CURENT
SENSING
CIRCUIT
105

MONITOR
CIRCUIT
170
STORAGE
RESOURCE
180
144
I L1
SAMPLE
DATA
185
NODE
155
160
D
S
G
150
100
PROCESSOR
CIRCUIT
192
110-1
DR1
DR2
110-2
+V_IN
VOLTAGE
SOURCE
120
CONTROLLER
130
EXAMPLE
PHASE
OF ONE
OR MORE
PHASES
VALUE
195
REPORT AVERAGE
CURRENT
R1
R2

Vin
150
155
147
125
160
118
V2
V1
LDrv
170
320
Vbias
330
(V1-V2)
+Vbias
$t_1$
$t_2$
180
185-1
185-2
190
340
TO CONTROLLER 130
195

230
195
80
60
40
20
TIME
MICROSECONDS
CURRENT
MAGNITUDE

POWER SUPPLY CIRCUITRY AND CURRENT MEASUREMENT

BACKGROUND

An example of a conventional DC-DC converter is a so-called synchronous buck converter. It has minimal components, and therefore is widely used in voltage regulator applications. In an example conventional application, the input voltage to the buck converter is typically $12V_{DC}$. An output voltage produced by the buck converter may be $5.0V_{DC}$, 3.3 $V_{DC}$, or even lower.

A typical configuration of a conventional voltage converter includes one or more power converter phases. Each power converter phase can include an inductor, a high side switch (a.k.a., a control switch) and a low side switch (a.k.a., a synchronous switch).

In general, during operation, a control circuitry associated with a conventional voltage converter repeatedly pulses the high side switch ON to convey power from a power source through the one or more inductors in the phases to a dynamic load. The control circuitry repeatedly pulses the low side switch ON (in between switching the high side switch ON) to provide a low impedance path from a node of the inductor to ground. Thus, the energy stored in the inductor increases during a time when the high side switch is ON and decreases during a time when the low side switch is ON. During switching operation, the inductor transfers energy from the input to the output of the converter.

In certain power supply applications, it is useful to know how much current is delivered to a respective load by each of one or more phases in the power supply. For example, the average current value can be used as an input to a control loop.

To measure current, one conventional application includes disposing a resistor in a respective phase. The resistor is disposed in series with an inductor of the respective phase. Via measurements of the differential voltage across the resistor, it is possible to determine how much current is delivered by the phase to a respective load.

In accordance with another conventional technique, such as a so-called DCR (Direct Current Resistance) method, a series circuit including a resistor and a capacitor can be disposed in parallel with the inductor of a respective power supply phase. In theory, the RC time constant will produce a measurable capacitor voltage that matches the inductor current. Thus, based on the voltage across the resistor in the DCR sensing circuit, it is possible to determine how much current is delivered by the phase to a respective load.

BRIEF DESCRIPTION

Conventional applications such as those as discussed above can suffer from a number of deficiencies. For example, inclusion of a resistor in series with a respective power supply phase is often undesirable because the resistor results in dissipation of heat, reducing the conversion efficiency of the power supply. Moreover, increasing a number of components in a circuit also typically translates into lower circuit reliability. Inclusion of the resistor in a phase, although it may be a rather small component, increases the size of the power supply circuit.

Additionally, DCR current sensing can be inaccurate due to fast switching frequencies in which parasitics arise or when the inductor coil heats-up. When the temperature of the inductor increases, its resistance changes. Both conditions can affect the tuned circuit network, rendering the conventional current sense measurement less accurate. Furthermore, conventional DCR current sensing typically requires low pass filtering and may require additional pins on a chip device to implement.

Embodiments herein deviate with respect to conventional applications. For example, embodiments herein include novel ways of measuring of a phase current such as an average current in a power supply phase.

More specifically, one embodiment herein includes a power supply circuit. The power supply circuit includes an inductor, a monitor circuit, a storage resource, and a processor circuit. The inductor is an electronic circuit component in a phase of the power supply that conveys current to a load. The monitor circuit monitors and samples the voltage of a node in the power supply. A magnitude of the voltage at the node varies depending on an amount of current passing through the inductor to the load. In one embodiment, the voltage of the node is a ramp or saw-tooth shaped voltage sampled by the monitor circuit. The storage resource stores one or more sample voltages of the ramp voltage at the node. A processor circuit utilizes the one or more sample voltages stored in the storage resource to produce a value indicative of the amount of average current conveyed through the inductor to the load.

The power supply circuit or power converter phase can further include one or more switches such as a control switch and/or a synchronous switch. The one or more switches can be coupled to a node of the inductor. In one embodiment, the processor circuit computes the value of the inductor current based at least in part on a gain value of the current sensing circuit. The gain value can take and/or processing can into account an $R_{DS}$ of a switch coupled to the inductor in order to determine an amount of current conveyed by the inductor to the load.

The node sampled by the monitor circuit can be disposed in a path between the switch and the inductor.

The ramp voltage can be a multi-sloped waveform, slopes of which are produced as a result of switching a high side switch (e.g., control switch) and low side switch (e.g., a synchronous switch) in a power supply. The high side switch, the low side switch, and the inductor can be connected to a common circuit node that is sampled by the monitor circuit.

By further way of a non-limiting example, in one embodiment, the monitor circuit samples the ramp voltage of the common node between a respective peak voltage and a valley voltage of the waveform at the monitored node. In one embodiment, the monitor circuit obtains a first sample voltage at an offset time after occurrence of the peak voltage (e.g., maximum voltage of a given slope in the sawtooth waveform). The monitor circuit obtains a second sample voltage at an offset time before occurrence of the valley voltage (e.g., minimum voltage of the given slope in the sawtooth waveform).

A magnitude of the offset time after the peak voltage can be substantially equal to a magnitude of the offset time before valley voltage. The processor circuit utilizes the first sample voltage and the second sample voltage obtained from a given slope of the sawtooth waveform to produce the value indicative of an average current through the inductor. The current through the inductor varies over time between the peak and valley voltages of the sawtooth voltage waveform.

The magnitude of the voltage at the common node (e.g., amongst the high side switch, low side switch, and the inductor node) is proportional to the amount of current conveyed through the inductor to the load. Thus, the first sample voltage of the common node represents a first amount of current conveyed through the inductor to the load at a first sample time. The second sample voltage of the common node represents a second amount of current conveyed through the inductor to the load at a second sample time.

In one embodiment, an average of the first sample voltage and the second sample voltage corresponds to the average current conveyed through the inductor to the load.

The embodiments as described herein are advantageous over conventional techniques. For example, the embodiments as discussed herein can utilize existing power supply circuitry without having to dispose an extra resistor in a respective path of a power converter phase to measure a current provided by the power converter phase. Measurement of current in a power converter phase without having to add an extra resistor as in conventional circuits results in higher conversion efficiency. That is, more of the power inputted to a power converter phase is conveyed and dissipated in a load as opposed to being dissipated in the power converter phase when in-line resistor is not implemented.

Note that embodiments herein can include analog and/or digital circuitry (e.g., one or more processor devices) to carry out and/or support any or all of the method operations disclosed herein. In other words, in one embodiment, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product that has a non-transitory computer-storage medium (e.g., memory, disk, flash, . . . ) including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable storage medium or non-transitory computer readable media such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be installed onto a controller to cause the controller to perform the techniques explained herein.

Accordingly, one particular embodiment of the present disclosure is directed to a computer program product that includes a computer readable medium having instructions stored thereon for supporting operations such as controlling phases in a power supply. For example, in one embodiment, the instructions, when carried out by a processor, cause the processor in a current sensing circuit to: monitor a magnitude of a voltage at a node disposed between an inductor and a switch, the voltage of the node varying depending on an amount of current passing through the inductor and the switch to the load; obtain at least one sample voltage of the node; and utilize the at least one sample voltage to produce a value indicative of an amount of current through the inductor. By way of a non-limiting example, the value can be computed based at least in part on a resistance of the switch during an ON state.

The ordering of the steps has been added for clarity sake. These steps can be performed in any suitable order.

It is to be understood that the system, method, apparatus, etc., as discussed herein can be embodied strictly as hardware, as a hybrid of software and hardware, or as software alone such as within a processor, or within an operating system or within a software application. Example embodiments of the invention may be implemented within products and/or software applications such as those developed or manufactured by International Rectifier Corporation of El Segundo, Calif., USA.

As discussed herein, concepts herein are well suited for use in applications such as switching power supplies, voltage regulators, low voltage processors, buck converters, boost regulators, buck-boost regulators, etc. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where appropriate, that each of the concepts can optionally be executed independently of each other or in combination with each other. Accordingly, the one or more aspects of the present invention or inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations, elements, aspects, etc.) of the invention(s), the reader is directed to the textual Detailed Description section and corresponding figures of the present disclosure as further discussed below. Thus, the following Detailed Description, in addition to providing an intricate description of details of the invention, also provides a further summary of aspects of the invention or inventions.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Embodiments herein include novel ways of measuring current in a switching power supply circuit. For example, in accordance with one embodiment, a power supply circuit includes an inductor, a monitor circuit, a storage resource, and a processor circuit. The inductor resides in a phase of the power supply and conveys current to a load. The monitor circuit monitors and samples the voltage of a node in the power supply. The voltage of the node may be a sawtooth or ramp waveform sampled by the monitor circuit. A magnitude of the voltage at the node varies depending on an amount of current passing through the inductor to the load. The monitor circuit initiates storage of the samples in a storage resource. A processor circuit utilizes the multiple sample voltages stored in the storage resource to produce a value indicative of the amount of average current conveyed through the inductor to the load.

Figure 1:
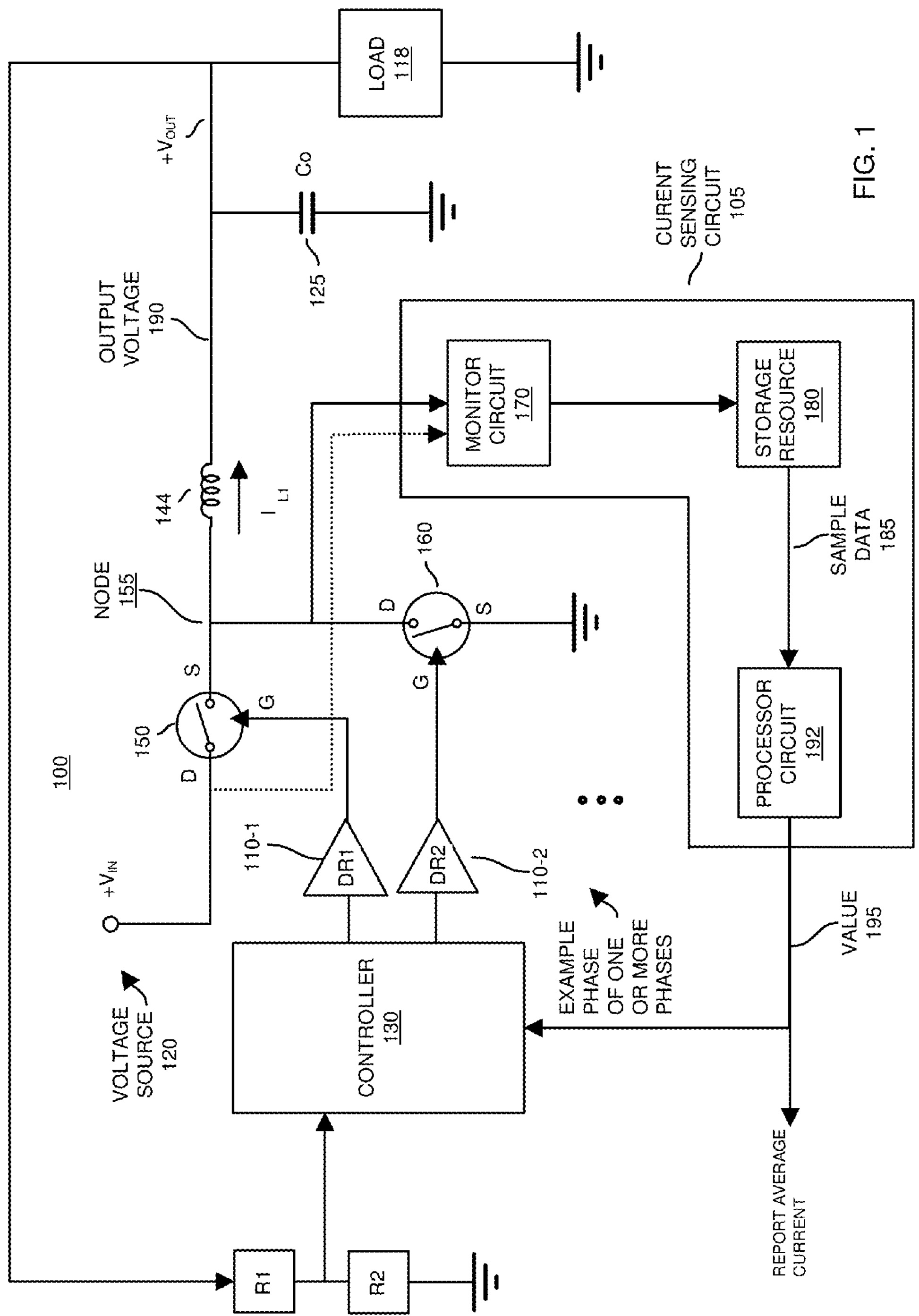
FIG. 1 is an example diagram of power supply circuitry including a novel circuit to measure current according to embodiments herein.

More specifically, FIG. 1 is an example diagram of power supply circuit including one or more power converter phases according to embodiments herein.

As shown, power supply circuitry 100 includes controller 130, drivers 110 (e.g., driver 110-1, driver 110-2, etc.), control switch circuitry 150 (a.k.a., high side switch circuitry), synchronous switch circuitry 160 (a.k.a., low side switch circuitry), inductor 144, and load 118.

In general, power supply circuitry 100 receives and converts input voltage, $V_{IN}$, from voltage source 120 to output voltage 192, $V_{OUT}$, to power load 118. The amount of current consumed by the load 118 can change over time. The controller 130 can be configured to control the magnitude of the output voltage 192 to be within a desirable range.

During operation, based on the magnitude of the output voltage 190 as sensed between voltage divider including resistor R1 and R2, controller 130 controls a state of drivers 110-1 and 110-2. In accordance with input from controller 130, the driver 110-1 controls a state of respective control switch circuitry 150; driver 110-2 controls a state of respective synchronous switch circuitry 160.

Capacitor bank 125 includes one or more capacitors to temporarily store energy and provide energy to the load 118 when the control switch 150 is deactivated.

Power supply circuit 100 includes current sensing circuit 105 to monitor a magnitude of the voltage at node 155 and determine a magnitude of current delivered by the respective power converter phase to the load 118.

In one example embodiment, the node 155 is common to the control switch circuitry 150, the synchronous switch circuitry 160, and the inductor 144. That is, the source node of the control switch circuitry 150 is electrically coupled via a low impedance path to the drain of the synchronous switch circuitry 160 as well as to a node of the inductor 144.

When the synchronous switch circuitry 160 is ON, the magnitude of the voltage at node 155 varies depending on an amount of current conveyed through inductor 144 to the load 118. By way of a non-limiting example, current sensing circuit 105 produces a value 195 indicative of an amount of current through the inductor 144.

The value 195 can be used by the controller (130), used for reporting purposes, etc. In one embodiment, controller 130 uses the value 195 at least in part as a basis to control a state of control switch circuitry 150 and synchronous switch circuitry 160.

By way of further non-limiting example, the current sensing circuit 105 can include monitor circuit 170, storage resource 180, and processor circuit 190. The monitor circuit 170 can be any suitable circuit (e.g., analog and digital circuitry) to obtain samples of the magnitude of the voltage at node 155. For example, the monitor circuit 170 can include amplifier circuitry, filter circuitry, analog-to-digital converter circuitry, etc. In accordance with yet further embodiments, note that sampling can be done by measuring the voltage of node 155, by measuring a differential voltage across the control switch circuitry 150, etc.

In addition, note that the monitoring circuit 170 can receive input from other current sensing devices such as current-sensing-FETs, hall-effect-sensors, etc., that measure the amount of current delivered by the phase to the dynamic load 118.

Monitor circuit 170 initiates storage of the obtained sample data (e.g., one or more sample voltages of the magnitude of the voltage at node 155) in storage resource 180. The sample data 185 stored in the storage resource can be analog or digital information. In one embodiment, the storage resource 180 is a sample and hold circuit as discussed in the following figure. The sample and hold circuit stores analog sample voltages to produce value 195. In accordance with another embodiment, the storage resource stores sample data in a digital format.

The sample data in storage resource 180 is accessible by one or more resources. For example, processor circuit 190 uses the sample data 185 (e.g., digital data, sample and hold circuit data, etc.) in storage resource 180 as a basis in which to produce value 195. As previously discussed, the value 195 can indicate an amount of current conveyed through the inductor 144 to load 118.

In one embodiment, processor circuit 190 is a digital processing device such as a digital signal processor that processes and converts digital samples of the voltage at node 155 into value 195. In such an instance, the value 195 is a digital value forwarded to controller 130.

In accordance with another embodiment, the processor circuit 190 is an analog circuit configured to produce an analog value based on one or more analog samples stored in the storage resource 185. In this latter instance, the processor circuit 190 produces an analog value representative of the current through the inductor 144. Controller 130 can convert the analog signal into a digital value using an analog-to-digital converter.

Note that in the example as discussed above, the power supply circuitry 100 includes a single phase. It should be noted that the power supply circuitry can be expanded to include any number of phases. Power supply circuit 100 can include a respective current sensing circuitry 105 for each phase. Thus, embodiments herein can include multiple power converter phases, each of which is monitored by a respective current sensing circuit to determine an amount of current delivered to the load 118.

Figure 2:
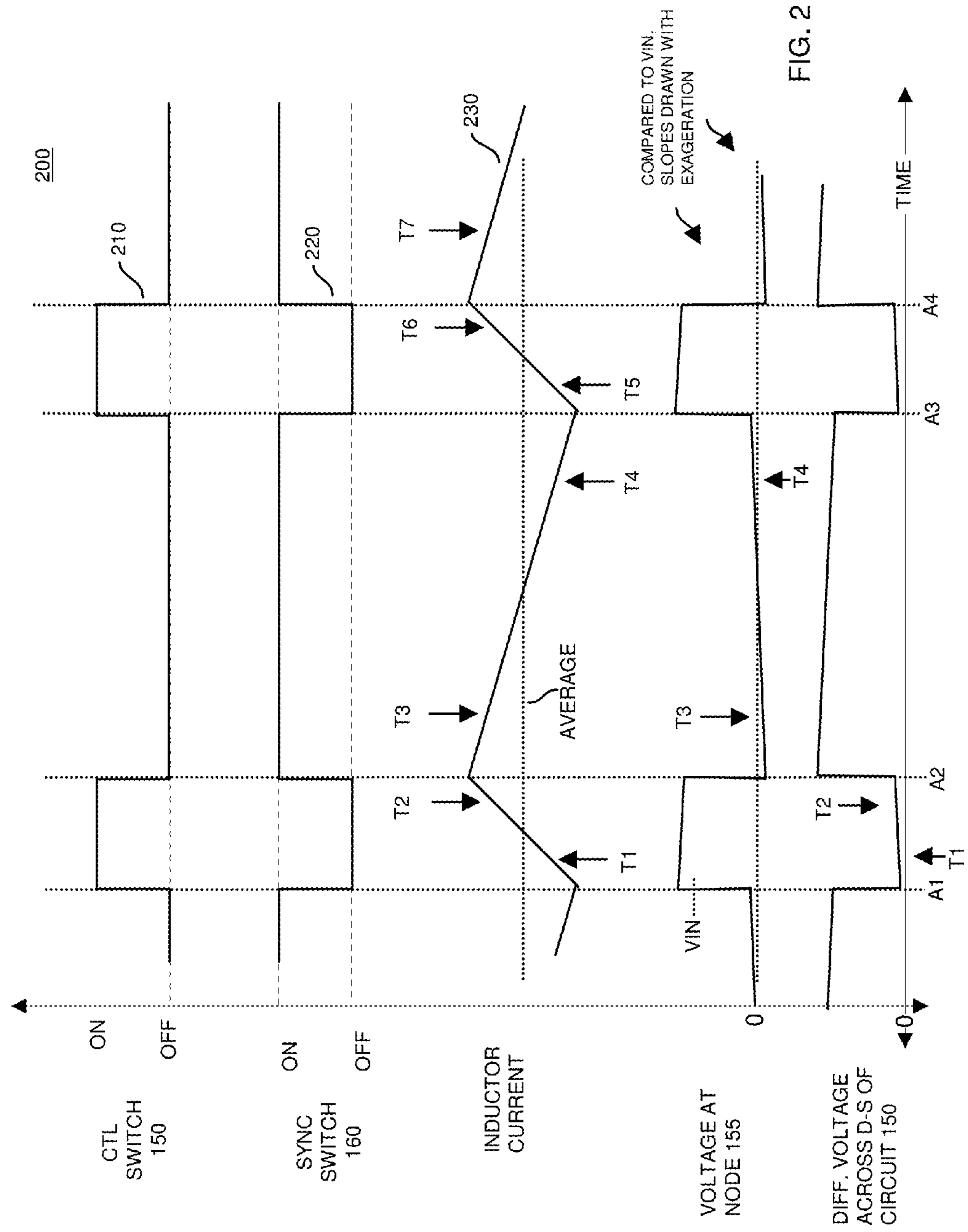
FIG. 2 is a timing diagram illustrating an example of sampling a node voltage of a power supply circuit to determine an amount of current supplied by a respective power converter phase to a load according to embodiments herein.

FIG. 2 is a timing diagram 200 illustrating control of switches in a power supply to produce an output voltage and power a load according to embodiments herein.

In a first portion of a switch control cycle between time A1 and time A3, when control switch circuitry 150 is turned ON or activated such as between time A1 and time A2 (while synchronous switch circuitry 160 is OFF or deactivated), a low impedance path is formed between respective source node (e.g., node labeled S) and drain node (e.g., node labeled D) of the control switch circuitry 150. Between time A1 and time A2, the amount of current flowing from the input voltage 110 through the control switch circuitry 150 and through the inductor 144 to the load 118 increases. When in an OFF state, between time A1 and time A2, little or no current flows through synchronous switch circuitry 160.

In a second portion of the switching control cycle between time A2 and time A3, when synchronous switch circuitry 160 is turned ON or activated (while control switch circuitry 150 is OFF or deactivated), a low impedance path is formed between respective source node (e.g., node labeled S) and drain node (e.g., node labeled D) of the synchronous switch circuitry 160. The amount of current flowing through the inductor 144 to the load 118 decreases. When in an OFF state between time A2 and time A3, little or no current flows through control switch circuitry 150.

The current, $I_{L1}$, through the inductor 144 varies in a similar manner for each switching cycle of multiple switching cycles. For example, the current through the inductor 144 increases when the high side switch is activated; the current through the inductor 144 decreases when the low side switch is activated.

The duration or apportionment of activating the high side switch and the low side switch in a respective switching cycle can vary depending on the load 118. Also, the length or period of each switching cycle can vary over time to accommodate different consumption of current by load 118. A different number of phases can be activated to supply current to the load 118 as well.

In one embodiment, when the synchronous switch circuitry 160 is ON (and control switch circuitry 150 is OFF), the magnitude of the voltage at node 155 (and current through the inductor 144) is a ramp or saw-tooth type waveform 230 as shown in FIG. 2.

In a downward slope of the waveform 230, the average voltage magnitude of the node 155 (and average inductor current) is a value between the peak voltage of the node 155 (e.g., approximately at time A2) and valley voltage of the node 155 (e.g., at time A3).

In an upward slope of the waveform 230, the average voltage magnitude across D-S of 150 (which corresponds with average inductor current) is a value between the valley of the differential voltage across D-S of 150 at time A3 and peak voltage of the differential voltage across D-S of 150 at time A4.

As previously mentioned, the control circuitry 130 controls the pulse durations of driving the control switch circuitry 150 and the synchronous switch circuitry 160 over each of multiple switching cycles such that the power supply circuitry 100 maintains the output voltage 192 within a desired magnitude range.

In one embodiment, each of the synchronous switch circuitry 160 and the control switch circuitry 150 include one or more field effect transistors. Note that other suitable switch-type components can be used in place of field effect transistors in accordance with different embodiments.

As briefly discussed above, the monitor circuit 170 monitors and samples the voltage of node 155 in the power supply 100. By way of a non-limiting example, the current sensing circuit 105 in power supply 100 can be configured to obtain each of the third sample voltage at T3, fourth sample voltage at T4, seventh sample voltage at T7, etc., at different times in accordance with a single-ended or single point measurement technique. Single-ended measuring includes monitoring a single node such as node 155 as opposed to performing a conventional differential measurement technique in which a voltage is measured across multiple nodes.

To sample at times T1 and T2, T5 and T6, etc., the current sensing circuit 105 can measure a differential voltage across the drain and source nodes of control switch circuitry 150.

Thus, in one embodiment, note that the monitor circuit 170 can include circuitry to measure a differential voltage across the source and drain node of the control switch circuitry 150 160 when it is activated to calculate the value 195 as discussed herein. The value of $R_{DS}$ can be determined via calibration prior to operation of the power supply 100 to power the load 118. In such an instance, the differential voltage across the switch is substantially equal to the current through the inductor 144 multiplied by the ON resistance of the control switch circuitry 150. This will be discussed in more detail later in this specification and is a basis in which to calculate an amount of the current through the inductor 144.

The ON resistance or $R_{DS}$ of the respective switches (e.g., high side switch or low side switch) can be any suitable value. In one embodiment, the $R_{DS}$ of the switches is on the order of micro-ohms or milli-ohms.

The current provided by each power converter phase in the power supply 100 can be any suitable value and vary depending on the embodiment. In one embodiment, each phases provides up to or more than 50 amperes of current to the load 118.

In accordance with further embodiments, a magnitude of the voltage at the node 155 varies depending on an amount of current passing through the inductor to the load and a corresponding $R_{DS}$ (or resistance of the switch while in an ON state) of the low side switch that happens to be activated. In other words, between time A1 and time A2, the differential voltage across the drain and source nodes of the control switch circuitry 150 depends on the amount of current $I_{L1}$ as well as the ON resistance of the control switch circuitry 150.

Between time A2 and time A3, the magnitude of voltage at node 155 depends on the ON resistance of the synchronous switch circuitry 160.

As mentioned, in one embodiment, the voltage of the node 155 is a ramp or saw-tooth shaped voltage sampled by the monitor circuit 170. The change in the voltage magnitude along a slope of the ramp voltage (e.g., waveform 230) between a peak and subsequent valley can be substantially linear.

In one embodiment, as mentioned above, via input from the monitor circuit 170, the storage resource 180 stores multiple sample voltages of the waveform 230 (e.g., ramp voltage). The processor circuit 190 utilizes the multiple sample voltages stored in the storage resource 180 to produce the value 190 indicative of the amount of average current conveyed through the inductor 144 to the load 118.

By further way of a non-limiting example, in one embodiment, the monitor circuit 170 samples the node 155 between a respective peak voltage and a valley voltage. For example, in one embodiment, the monitor circuit 170 obtains a first sample voltage at time T3. Time T3 occurs at an offset time (e.g., a first offset time X1) after occurrence of the peak current (e.g., maximum current of a given slope in the saw-tooth waveform 230). The time difference between time A2 and time T3 can be a value, X1. Thus, sampling can be delayed by an amount of X1 following time A2.

The monitor circuit obtains a second sample voltage at time T4. Time T4 occurs at an offset time (e.g., a second offset time X2) before occurrence of the following valley current at time A3. In other words, the monitor circuit 170 samples the node 155 an offset time X2 before time A3.

The magnitude of the offset time X1 can be substantially equal to or different than a magnitude of the offset time X2.

The sample values taken at time T3 and time T4 are stored in the storage resource 180 as sample data 185. In one embodiment, the sample of the voltage at node 155 at time T3 represents an amount of current through the inductor 144 at time T3. The sample of the voltage at node 155 at time T4 represents an amount of current through the inductor 144 at time T3.

The processor circuit 190 utilizes the sample voltage taken at time T3 and the sample voltage taken at time T4 to produce the value 195 indicative of the average current through the inductor 144. For example, in such an embodiment, when X1=X2, the processor circuit 190 averages the sample voltage taken at time T3 and the sample voltage at time T4 to produce the value 195 indicating an average amount of current through the inductor 144 between time A2 and time A3. Between time A2 and time A3, the inductor 144 is being discharged.

In one embodiment, for the time between A2 and time A3, the value 195 and/or voltage of the node 155 is substantially equal to an ON resistance of the synchronous switch circuitry 160 multiplied by the current conveyed through the inductor to the load. For example, the current through the inductor 144 follows a path from ground, through the source-drain of the synchronous switch circuitry 160 through the inductor 144 to load 118. The same current passes through the synchronous switch circuitry 160 and the inductor 144. Via mathematical computations, the current through the inductor 144 can be deduced based on the magnitude of the voltage at node 155 and the ON resistance of the synchronous switch circuitry 160.

Figure 3:
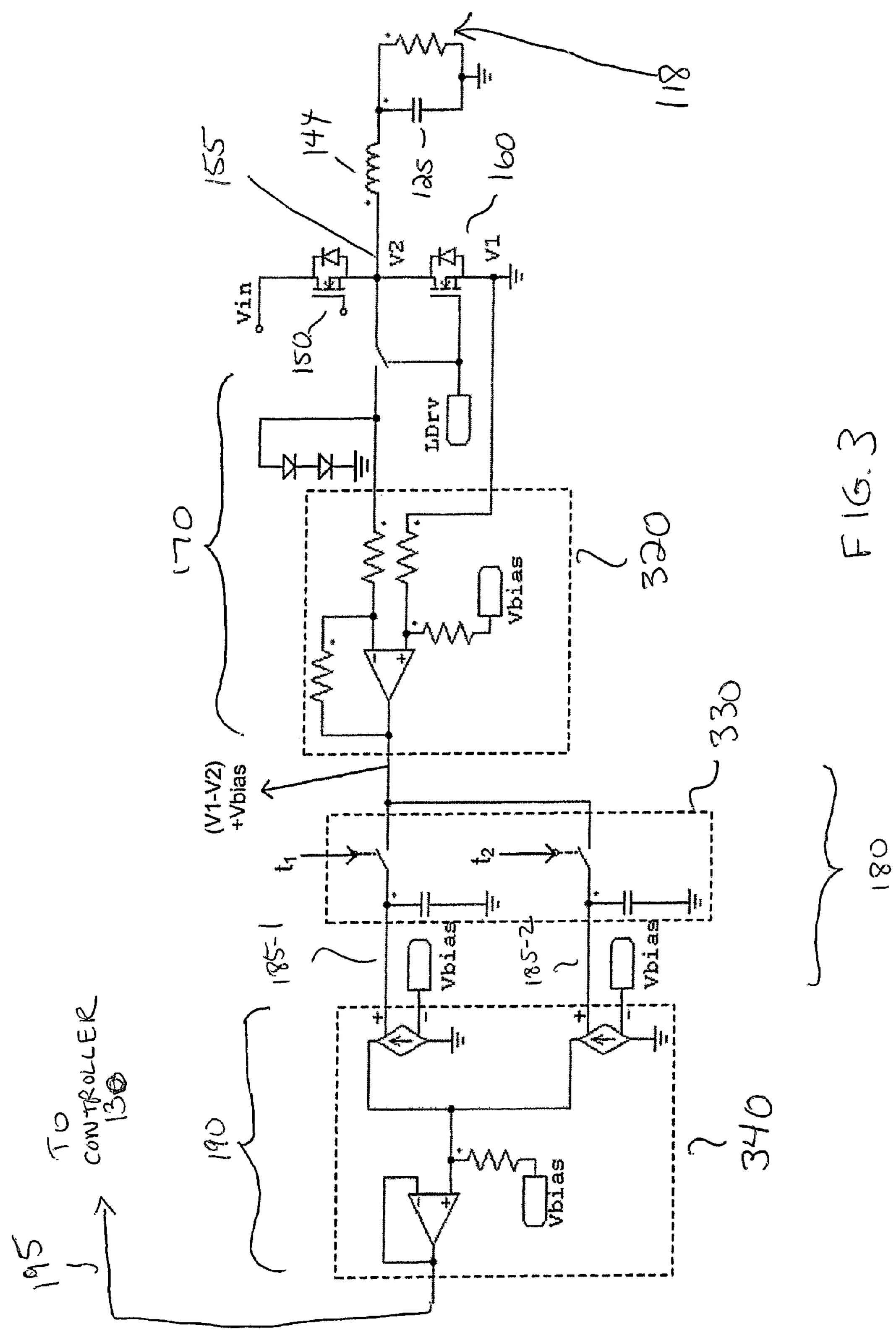
FIG. 3 is a diagram of an example circuit to measure current supplied by a respective power converter phase according to embodiments herein.

As discussed in the embodiment of FIG. 3, the monitor circuit 170 can amplify and bias the sampled voltage at node 155 to produce the sample voltages. The gain and bias imparted by these circuits can be taken into account to compute the average current value 195.

The embodiments as described herein are advantageous over conventional techniques. For example, the embodiments as discussed herein can utilize existing power supply circuitry without having to dispose an extra resistor in a respective path of a power converter phase to measure a current provided by the power converter phase. Measurement of current in a power converter phase without having to add the extra resistor as in conventional circuits results in higher conversion efficiency. That is, more of the power inputted to a power converter phase is conveyed and dissipated in a load 118 as opposed to being dissipated in the power converter phase.

In a similar vein, the current sensing circuit 105 can be configured to produce a value 195 for each of the segments of the waveform 230. For example, the monitor circuit 170 can be configured to obtain a sample differential voltage across the source and drain nodes of the control switch circuitry 150 at time T1 as well as obtain a sample differential voltage at time T2 during charging of the inductor 155 when the control switch circuitry 150 is activated and the synchronous switch circuitry 160 is deactivated. The time difference between time A1 and time T1 can be substantially equal to the time difference between time T2 and time A2.

Based on this symmetry of taking samples in the time between A1 and A2, the processor circuit 190 averages the sample voltage taken at time T1 and the sample voltage at time T2 to produce the value 195 indicating an average amount of current through the inductor 144 between time A1 and time A2.

Note that the monitor circuit 170 can be configured to take any number of samples (e.g., one or more) during a respective slope to produce the value 190. For example, the current sensing circuit 105 can use a single sample voltage of the node 155 (e.g., midway between a peak and a valley) to produce the value 190; the current sensing circuit 105 can use two samples as discussed above; the current sensing circuit 105 can use 3, 4, 5, 6, 7, 8, etc., samples between, for example, time A2 and time A3 to produce the value 195. In one embodiment, the sample values taken at times T1, T2, T3, and T4 can be used to produce the value 195 indicating the average current through the inductor 144.

In accordance with further embodiments, interpolation and/or extrapolation techniques can be applied to the one or more samples to produce the value 195. For example, if the offset time X1 is not equal to the offset time X2, the average inductor current can be calculated using extrapolation and other adjustments.

FIG. 3 is a diagram illustrating an example current sensing circuit according to embodiments herein.

In a manner as previously discussed, the controller 130 produces control signals to control a state of control switch circuitry 150 and synchronous switch circuitry 160.

Monitor circuit 170 can include a level shifter stage 320. In one embodiment, the level shifter stage includes an amplifier circuitry. As its name suggests, the amplifier circuitry in stage 320 amplifies the voltage at node 155. In one embodiment, stage 320 is a level shifter plus a differential amplifier. The amplifier can also bias an output voltage of the amplifier circuitry. In one embodiment, the differential amplifier circuitry both amplifies as well as biases or shifts the differential voltage V2−V1 when the synchronous switch circuitry 160 is activated or ON. In one embodiment, a magnitude of the output voltage of the amplifier circuitry in the level shifter stage 320 is $K\cdot(V1-V2)+V_{BIAS}$, where K is a gain value.

In one embodiment, any portion of the current sensing circuit 105 can reside in a semiconductor chip. The level shifter stage 320 can be calibrated by passing a known amount of current through the synchronous switch circuitry 160 when it is in an ON state and measuring the voltage difference between the source node (e.g., V1) of synchronous switch circuitry 160 and the drain node (e.g., V2) of synchronous switch circuitry 160. The resistors in the level shifter stage can be trimmed to produce a desired amplifier output for a given input of current through the synchronous switch circuitry 160.

This resistor trimming process can further include activating the control switch circuitry 150 and passing a known current through the control switch circuitry 150. At such time the resistors in the level shifter stage 320 can be adjusted again.

The sample and hold stage 330 can include one or more sample and hold circuit circuits to store the samples taken with respect to a given slope of the waveform 230 as discussed above in FIG. 2.

Finally, Referring again to FIG. 3, assuming the sample and hold stage 330 stores a sample voltage of node 155 taken at time T3 and a sample voltage taken at time T4, the summer stage 340 produces and outputs value 195 based on the sample voltages at these times.

Based on the trimming as discussed above, and a gain and bias associated with the current sensing circuit 105, the value 195 produced by the summer stage 340 can be a voltage equal to $K\cdot I_{L1}+V_{BIAS}$. In such an instance, the average current in the inductor 144 can be computed as follows:

$$I_{L1}=(\text{VALUE }195-V_{BIAS})/K,$$

where K is a value dependent on the gain of level shifter stage 320 and the ON resistance (e.g., $R_{DS}$) of the switch.

As an alternative to resistor trimming of the level shifter stage 320 during calibration, prior to the monitoring and sampling, embodiments herein can include a calibration to determine the gain and bias of the amplifier circuit as well as the ON resistances of the high side switch and low side switch. These values can then be stored and subsequently used as a basis to convert the sample voltages representing samples of the inductor current into the average inductor current value.

Accordingly, in one example embodiment, the processor circuit 190 computes the value 195 of the inductor current based at least in part on a gain value taking into account an $R_{DS}$ of a switch coupled to the inductor 144. As previously discussed, the node 155 sampled by the monitor circuit 170 is disposed in a path between the switch (e.g., control switch circuitry 150, synchronous switch circuitry 160, . . . ).

In one embodiment, output of the sample and hold circuit stage 330 is updated once each successive switching cycle. Hence, the value 195 representing the average current can be updated each switching cycle or portion thereof. Compared to the actual current passing through the inductor 144, the average value 195 is delayed by up to a switching cycle.

Figure 4:
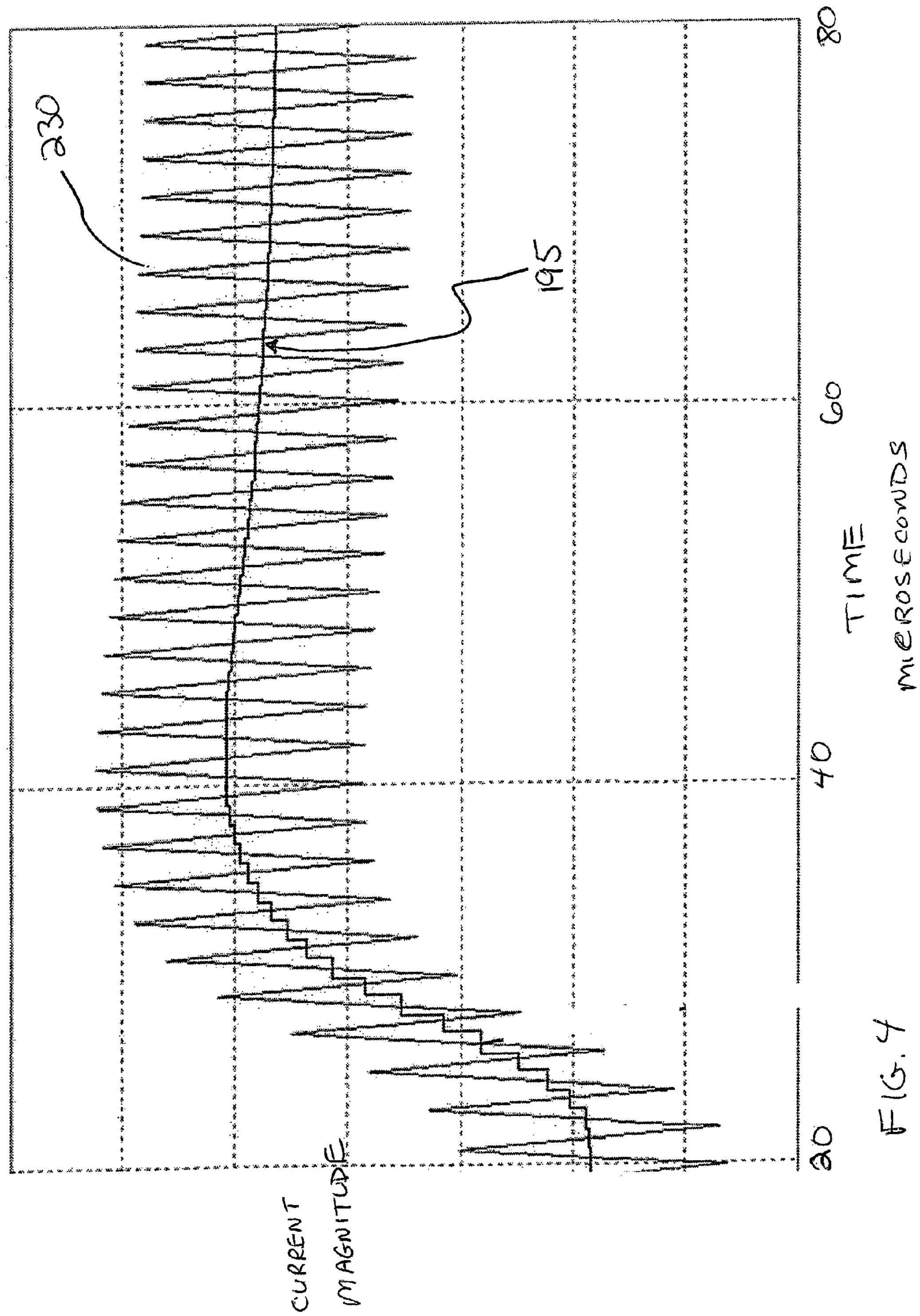
FIG. 4 is a timing diagram illustrating generation of an average inductor current value over time according to embodiments herein.

FIG. 4 is a graph 400 illustrating a change in current conveyed by a respective phase to a load according to embodiments herein.

The current sensing circuit 105 monitors the current conveyed through the inductor 144 in a manner as previously discussed to produce value 195. In one embodiment, the current sensing circuit 105 continuously generates and/or updates the value 195 over time such that value 195 closely tracks or provides an indication of the average current through the inductor 144 at any given time.

Figure 5:
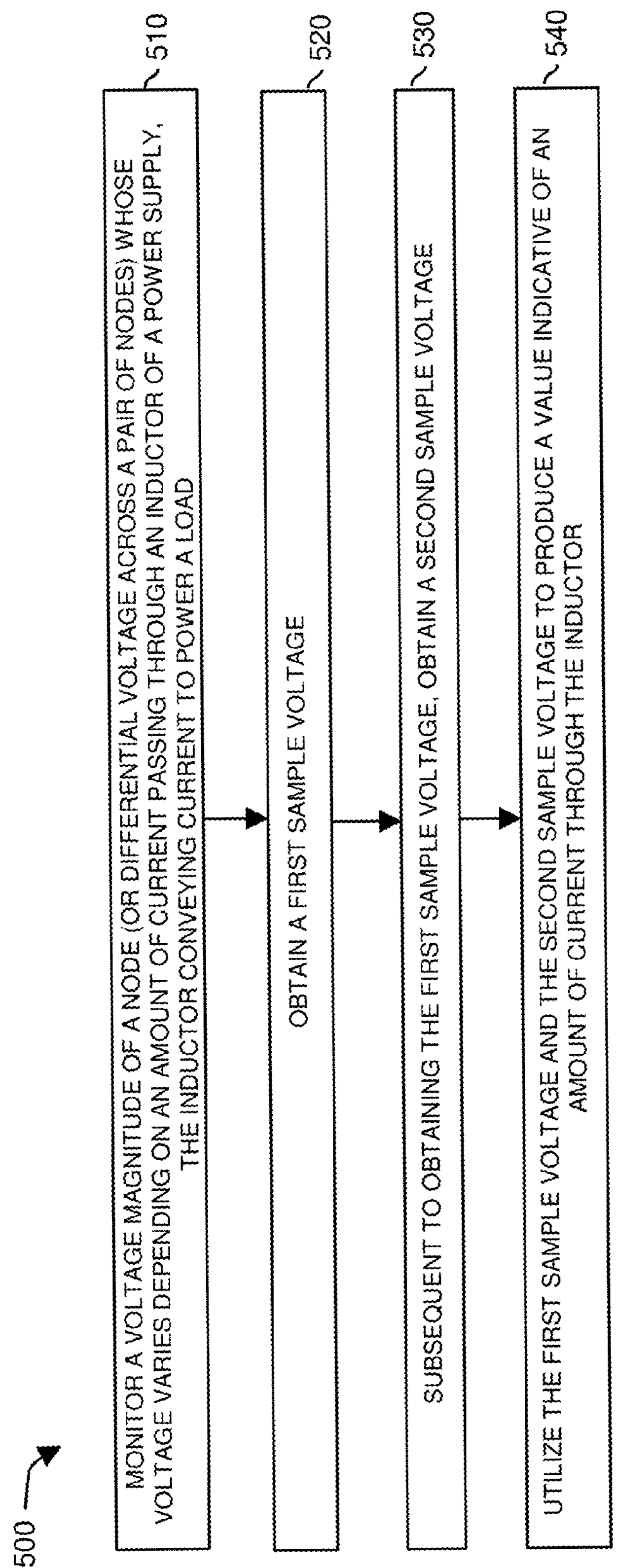
FIG. 5 is a flowchart illustrating an example method according to embodiments herein.

FIG. 5 is a flowchart 500 illustrating an example method of current sensing according to embodiments herein. Note that there will be some overlap with respect to concepts as discussed above. Also, the steps can be executed in any suitable order.

In step 510, the current sensing circuit 105 monitors a voltage magnitude of node 155 whose voltage varies depending on an amount of current passing through inductor 144 of the power supply 100. As discussed, the inductor 144 conveys current to power a load 118.

In step 520, the current sensing circuit 105 obtains a first sample voltage of the node 155.

In step 530, subsequent to obtaining the first sample voltage, the current sensing circuit 105 obtains a second sample voltage of the node 155.

In step 540, the current sensing circuit 105 utilizes the first sample voltage and the second sample voltage to produce a value 195 indicative of an amount of current through the inductor 144.

Figure 6:
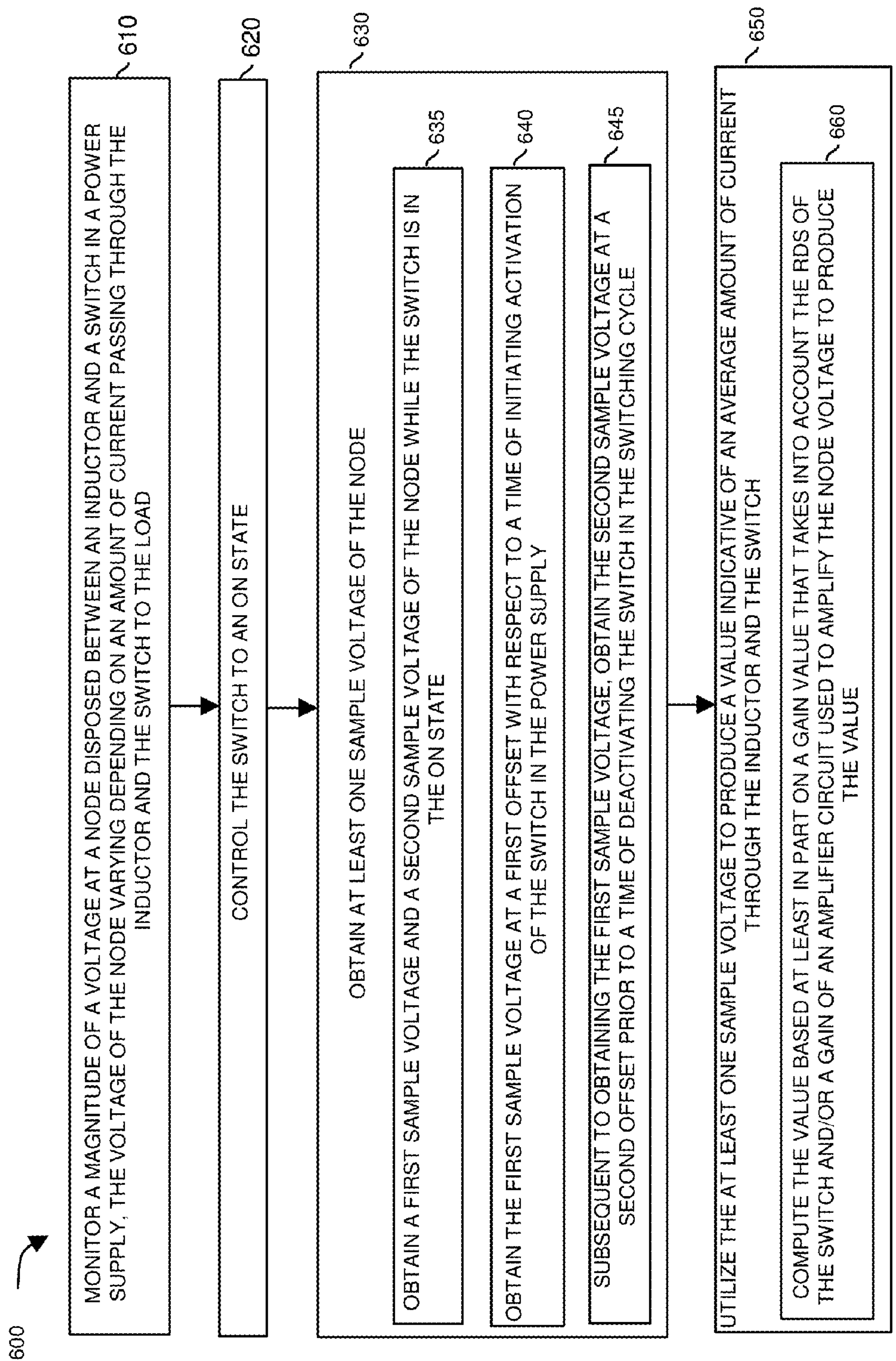
FIG. 6 is a flowchart illustrating an example method according to embodiments herein.

FIG. 6 is a flowchart 600 illustrating an example method of monitoring current provided by a respective power converter phase according to embodiments herein. Note that there will be some overlap with respect to concepts as discussed above. Also, the steps can be executed in any suitable order.

Additionally, although the flowchart below discuss measuring a voltage at a single node in a power supply, as discussed herein, embodiments herein can include measuring a differential voltage such as across the source and drain of the control switch circuitry 150 as discussed herein. In such an embodiment, replace monitoring and measuring a node with monitoring and measuring a differential voltage.

In step 610, the current sensing circuit 105 monitors a magnitude of a voltage at a node 155 disposed between an inductor 144 and a respective switch (e.g., high side switch and/or low side switch) in power supply 100. The magnitude of the voltage of the node 155 varies depending on an amount of current passing through the inductor 144 and the switch to the load 118.

In step 620, the controller 130 controls the switch to an ON state.

In step 630, the current sensing circuit 105 obtains at least one sample voltage of the node 155.

In sub-step 635, the current sensing circuit 105 obtains a first sample voltage and a second sample voltage of the node 155 while the switch is in the ON state.

In sub-step 640, the current sensing circuit 105 obtains the first sample voltage at a first offset with respect to (e.g., after) a time of initiating activation of the switch in the power supply circuit 100.

In sub-step 645, subsequent to obtaining the first sample voltage, the current sensing circuit 105 obtains the second sample voltage at a second offset prior to a time of deactivating the switch in the switching cycle.

In step 650, the current sensing circuit 105 utilizes the at least one sample voltage to produce a value 195 indicative of an average amount of current through the inductor 144 and the switch.

In sub-step 660, the current sensing circuit 105 computes the value based at least in part on the $R_{DS}$ of the switch and/or a gain/bias of an amplifier circuit used to amplify the node voltage to produce the value 195. By way of a non-limiting example, the gain/bias and/or calibration trimming of the amplifier circuit may take into account the $R_{DS}$ of the switch.

Figure 7:
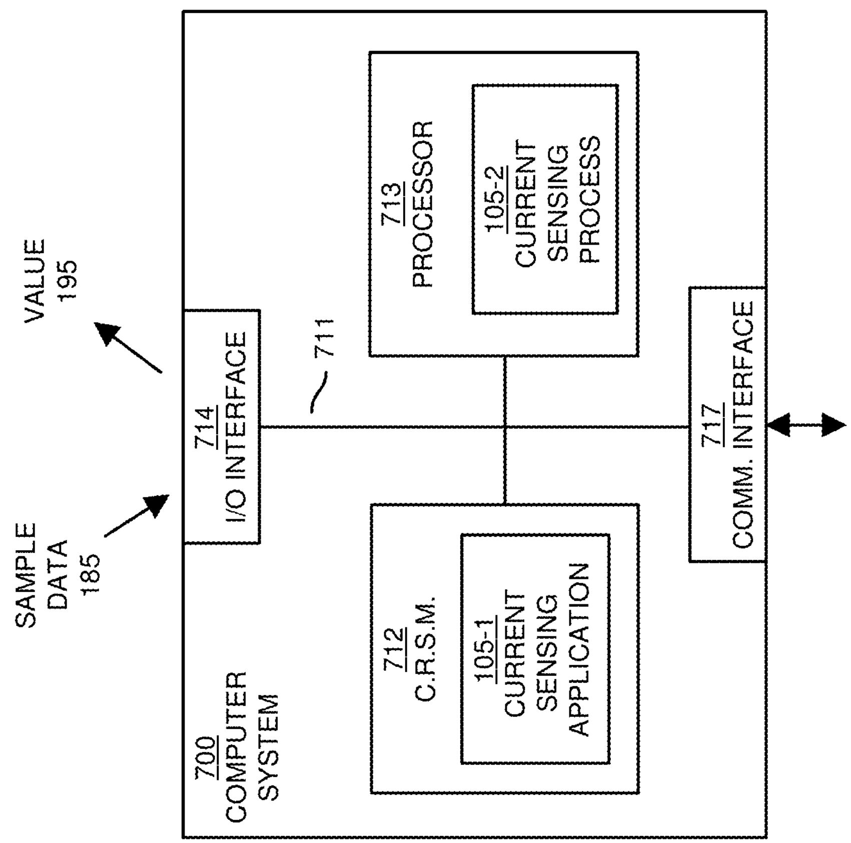
FIG. 7 is a diagram illustrating an example architecture to carry out one or more methods according to embodiments herein.

FIG. 7 is an example block diagram of a computer system for implementing any of the operations associated with current sensing according to embodiments herein. In one embodiment, the current sensing circuit 105 includes computer system 700.

As shown, computer system 700 of the present example can include an interconnect 711 that couples computer readable storage media 712 such as a non-transitory type of media (i.e., any type of hardware storage medium) in which digital information can be stored and retrieved, a processor 713 (e.g., a digital signal processor), I/O interface 714, and a communications interface 717.

I/O interface 714 provides connectivity to resources such as controller 130, storage resource 180, etc.

Computer readable storage medium 712 can be any hardware storage device such as memory, optical storage, hard drive, floppy disk, etc. In one embodiment, the computer readable storage medium 712 stores instructions and/or data.

Communications interface 717 enables the computer system 700 and processor 713 to communicate with other resources in power supply 100. I/O interface 714 enables processor 713 to receive and forward information.

As shown, computer readable storage media 712 is encoded with current sensing application 105-1 (e.g., software, firmware, etc.) executed by processor 713. Current sensing application 140-1 can be configured to include instructions to implement any of the operations as discussed herein.

During operation of one embodiment, processor 713 accesses computer readable storage media 712 via the use of interconnect 711 in order to launch, run, execute, interpret or otherwise perform the instructions in current sensing application 105-1 stored on computer readable storage medium 712.

Execution of the current sensing application 105-1 produces processing functionality such as current sensing process 105-2 in processor 713. In other words, the current sensing process 105-2 associated with processor 713 represents one or more aspects of executing current sensing application 105-1 within or upon the processor 713 in the computer system 700.

As previously discussed, current sensing application 105-1 can support receiving sample data and producing value 195.

Techniques herein are well suited for use in power supply applications and measuring current. However, it should be noted that embodiments herein are not limited to use in such applications and that the techniques discussed herein are well suited for use in other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:

monitoring a voltage magnitude of a common circuit node connecting an inductor, a control switch, and a synchronous switch of a power supply, a voltage of the common circuit node varying depending on an amount of current passing through the inductor to a load;

at a first sample time, obtaining a first sample voltage of the common circuit node;

at a second sample time, subsequent to obtaining the first sample voltage, obtaining a second sample voltage of the common circuit node; and utilizing the first sample voltage and the second sample voltage to produce a value indicative of an amount of current through the inductor wherein the first sample time represents a first instance in time at which the voltage of the common circuit node is sampled to produce the first sample voltage; and wherein the second sample time represents a second instance in time at which the voltage of the common circuit node is sampled to produce the second sample voltage, the second instance in time occurring after the first instance in time, the method further comprising:

at the first sample time, receiving the first sample voltage from a level shifter stage monitoring a voltage across the synchronous switch, the level shifter stage amplifying the voltage across the synchronous switch and adding a bias voltage to the amplified voltage across the synchronous switch at the first sample time to produce the first sample voltage;

at the second sample time, receiving the second sample voltage from the level shifter stage monitoring the voltage across the synchronous switch, the level shifter stage amplifying the voltage across the synchronous switch and adding the bias voltage to the amplified voltage across the synchronous switch at the second sample time to produce the second sample voltage.

2. The method as in claim 1, wherein utilizing the first sample voltage and the second sample voltage to produce the value includes computing the value based at least in part on a gain value that takes into account a drain-source resistance of the control switch.

3. The method as in claim 1, wherein the produced value indicates an average current conveyed through the inductor during a switching cycle of the power supply, the switching cycle including a first portion during which the control switch is activated and a second portion during which the synchronous switch in the power supply is activated.

4. The method as in claim 1, wherein obtaining the first sample voltage and obtaining the second sample voltage occur during a discharging of the inductor, the method further comprising:

during a charging of the inductor: i) obtaining a third sample voltage of the common circuit node, and ii) obtaining a fourth sample voltage of the common circuit node; and utilizing the first sample voltage, the second sample voltage, the third sample voltage, and the fourth sample voltage to produce the value indicative of an amount of current through the inductor.

5. The method as in claim 1, wherein the voltage of the common circuit node is a ramp voltage; and wherein obtaining the first sample voltage and obtaining the second sample voltage includes:

between a peak voltage and a successive valley voltage of the ramp voltage produced at the common circuit node:

obtaining the first sample voltage at a first offset after the peak voltage; and obtaining the second sample voltage at a second offset time prior to the valley voltage.

6. The method as in claim 5, wherein the first offset time is substantially equal to the second offset time; and wherein utilizing the first sample voltage and the second sample voltage to produce the value includes averaging the first sample voltage and the second sample voltage.

7. The method as in claim 1 further comprising:

during a switching cycle of the power supply:

obtaining the first sample voltage at a first offset with respect to a time of initiating activation of the synchronous switch in the power supply; and subsequent to obtaining the first sample voltage, obtaining the second sample voltage at a second offset prior to a time of deactivating the synchronous switch in the switching cycle.

8. The method as in claim 7, wherein the first offset is substantially equal to the second offset.

9. The method as in claim 1, wherein the voltage of the common circuit node is substantially equal to an ON resistance of the synchronous switch multiplied by the current conveyed through the inductor to the load.

10. The method as in claim 1 further comprising:

prior to the monitoring, initiating calibration of an amplifier circuit used to produce the first sample voltage and the second sample voltage, the calibration including trimming of an amplifier circuit depending on a drain-source resistance of the synchronous switch.

11. The method as in claim 1 further comprising:

in addition to obtaining the first sample voltage and obtaining the second sample voltage, obtaining additional sample voltages of the common circuit node; and utilizing the first sample voltage, the second sample voltage, and the additional sample voltages to produce the value indicative of the amount of current through the inductor.

12. The method as in claim 1 further comprising:

obtaining the first sample voltage and obtaining the second sample voltage during a mode in which the synchronous switch is activated to an ON state.

13. The method as in claim 1 further comprising:

obtaining the first sample voltage and the second sample voltage at different times in accordance with a single-ended measurement technique; and producing the value based at least in part on a drain-source resistance of the control switch.

14. The method as in claim 1, wherein utilizing the first sample voltage and the second sample voltage to produce the value includes:

averaging the first sample voltage and the second sample voltage to produce a biased average voltage value;

subtracting the bias voltage from the biased average voltage value to produce an average voltage value; and dividing the average voltage value by K, where K is a value dependent on a gain of the level shifter stage and an ON resistance of the synchronous switch.

15. The method as in claim 14, wherein the second sample time occurs after the first sample time; and wherein the first sample time and the second sample time are non-overlapping samples of the voltage of the common circuit node.

16. The method as in claim 15, wherein the voltage of the common circuit node is a ramp voltage; and wherein obtaining the first sample voltage and the second sample voltage includes:

between a peak voltage and a successive valley voltage of the ramp voltage produced at the common circuit node:

obtaining the first sample voltage at a first offset time after the peak voltage; and obtaining the second sample voltage at a second offset time prior to the valley voltage, the first offset time being substantially equal to the second offset time.

17. The method as in claim 1, wherein the first sample time and the second sample time are non-overlapping samples of the voltage of the common circuit node.

18. A method comprising:

monitoring a magnitude of a voltage at a common circuit node connecting an inductor, a control switch, and a synchronous switch of a power supply, the voltage of the common circuit node varying depending on an amount of current passing through the synchronous switch and the inductor to the load;

obtaining at least one sample voltage of the common circuit node; and utilizing the at least one sample voltage to produce a value indicative of an amount of current through the inductor, the value computed based at least in part on a resistance of the synchronous switch during an ON state of the synchronous switch;

wherein obtaining the at least one sample voltage of the common circuit node includes obtaining a first sample voltage of the common circuit node at a first sample time and obtaining a second sample voltage of the common circuit node at a second sample time while the synchronous switch is in the ON state;

wherein the first sample time represents a first instance in time at which the voltage of the common circuit node is sampled to produce the first sample voltage; and wherein the second sample time represents a second instance in time at which the voltage of the common circuit node is sampled to produce the second sample voltage, the second instance in time occurring after the first instance in time, the method further comprising:

at the first sample time, receiving the first sample voltage from a level shifter stage monitoring a voltage across the synchronous switch, the level shifter stage amplifying the voltage across the synchronous switch and adding a bias voltage to the amplified voltage across the synchronous switch at the first sample time to produce the first sample voltage; and at the second sample time, receiving the second sample voltage from the level shifter stage monitoring the voltage across the synchronous switch, the level shifter stage amplifying the voltage across the synchronous switch and adding the bias voltage to the amplified voltage across the synchronous switch at the second sample time to produce the second sample voltage.

19. The method as in claim 18 further comprising:

controlling the synchronous switch to the ON state;

controlling the control switch to an OFF state.

20. The method as in claim 19, wherein the produced value indicates an average current conveyed through the inductor and the synchronous switch, the method further comprising:

obtaining the first sample voltage at a first offset with respect to a time of initiating activation of the synchronous switch during a switching cycle in which the synchronous switch is activated; and subsequent to obtaining the first sample voltage, obtaining the second sample voltage at a second offset prior to a time of deactivating the synchronous switch in the switching cycle.

21. A system comprising:

an inductor to convey current to a load;

a monitor circuit to monitor a ramp voltage whose magnitude varies depending on an amount of current passing through the inductor to the load;

a circuit to store a first sample of the ramp voltage at a first instance in time and a second sample of the ramp voltage at a second instance in time; and a processor circuit that utilizes the first sample and the second sample to produce a value indicative of the amount of average current through the inductor to the load;

wherein the first sample time represents a first instance in time at which the ramp voltage is sampled to produce the first sample; and wherein the second sample time represents a second instance in time at which the ramp voltage is sampled to produce the second sample, the second instance in time occurring after the first instance in time, the ramp voltage being a voltage across a synchronous switch coupled to the inductor, the system further comprising:

a level shifter stage, the level shifter stage producing the first sample at the first sample time based on amplifying a voltage across the synchronous switch and adding a bias voltage to the amplified voltage across the synchronous switch at the first sample time to produce the first sample;

the level shifter stage producing the second sample that the second sample time based on amplifying the voltage across the synchronous switch and adding the bias voltage to the amplified voltage across the synchronous switch at the second sample time to produce the second sample.

22. The system as in claim 21 further comprising:

wherein the processor circuit computes the value based at least in part on a drain-source resistance of the synchronous switch.

23. The system as in claim 22, wherein the ramp voltage represents a voltage of a node disposed in a path between the synchronous switch and the inductor; and wherein the second instance in time occurs after the first instance in time.

24. The system as in claim 21 further comprising:

between a peak voltage and a subsequent valley voltage of the ramp voltage produced at the node:

obtaining the first sample at an offset time after the peak voltage; and obtaining the second sample at an offset time before the valley voltage; and wherein a magnitude of the offset time after the peak voltage is substantially equal to a magnitude of the offset time before the valley voltage.

* * * * *